US012737378B1

(12) United States Patent
Guo et al.

(10) Patent No.: US 12,737,378 B1
(45) Date of Patent: Sep. 15, 2026

(54) MODIFICATION OF A DATA MODEL INCLUDING A DATA SCHEMA AND AN ETL PIPELINE

(71) Applicant: INTERNATIONAL BUSINESS MACHINES CORPORATION, Armonk, NY (US)

(72) Inventors: Wen Wen Guo, Beijing (CN); Mai Zeng, Shi Jing Shan (CN); Tian Tian, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/189,170

(22) Filed: Apr. 24, 2025

(51) Int. Cl.
*G06F 16/25* (2019.01)

(52) U.S. Cl.
CPC .................................. *G06F 16/254* (2019.01)

(58) Field of Classification Search
None
See application file for complete search history.

(56) References Cited

U.S. PATENT DOCUMENTS

2009/0177671 A1* 7/2009 Pellegrini ............... G06F 16/90
2012/0324387 A1 12/2012 Rausch et al.
2013/0227573 A1* 8/2013 Morsi ................... G06F 16/254
2017/0032458 A1* 2/2017 Dembo ................. G06F 16/254
2019/0377817 A1* 12/2019 McCluskey ........... G06F 16/258
2021/0034623 A1* 2/2021 Sabhanatarajan ... G06F 16/2477
2022/0261247 A1* 8/2022 Muthuswamy ......... G06F 16/25
2024/0378186 A1* 11/2024 Paulraj .................. G06F 16/212

FOREIGN PATENT DOCUMENTS

CN 105976158 A 9/2016
CN 109669983 B 11/2020
CN 113139012 A 7/2021
CN 111082976 B 7/2022

OTHER PUBLICATIONS

Authors et al., "Permitting an Upgrade of Extract, Transform, and Load (Etl) Processes, Independent of a Customization Performed by a User", IP.com No. IPCOM000191508D. IP.com No. IPCOM000191508D, 18 pages.

Dinesh et al., "An efficient hybrid optimization of ETL process in data warehouse of cloud architecture", Dinesh and Devi Journal of Cloud Computing, 2024, 12 pages, https://doi.org/10.1186/s13677-023-00571-y.

Justia Patents, "Data Extraction, Transformation, And Loading (etl) Patents (Class 707/602)", May 13, 2025, 17 pages, https://patents.justia.com/patents-by-us-classification/707/602.

* cited by examiner

*Primary Examiner* — Son T Hoang
(74) *Attorney, Agent, or Firm* — Amin, Turocy & Watson, LLP

(57) ABSTRACT

A plurality of user-defined configuration files are received from a user interface. Each file corresponds to a task in the ETL pipeline and provides a self-contained specification for modifying its corresponding task. The plurality of configuration files are used to make granular modifications to logic of the ETL pipeline at a task level to implement changes to the data model.

20 Claims, 5 Drawing Sheets

510

```
"extract": {
  "0": {
    "id": "0",
    "type": "File",
    "version": "****",
    :timestamp": 0,
    "url" "localhost:1234/db.txt",
    "user": PaKmmegEBcML==",
    "password": "751pw7AU=="
  }
}
```

530

```
"persist": {
  "0": {
    "id": "0",
    "type": "Graph",
    "version": "****",
    :timestamp": 0,
    "url" "remote:localhost/Demo",
    "user": PaKmmegEBcML==",
    "password": "751pw7AU=="
  }
}
```

520

```
"LPAR": {
  "dlaID": "id",
  "label": "label",
  "name": "Name",
  "lparName": "LPARName",
  "vmID": "VMID",
  "numCPUS": "NumCPUs",
  "numDedicatedCPs": "NumDediatedCPs",
  "numSharedCPs": "NumShared CPs",
  "model": "Model",
  "modelID": "ModelID",
  "memorySize": "MemorySize"
}
```

540

```
"process": {
  "CopyIntoOrient": {
    "id": 0,
    "process": "CopyIntoOrient",
    "version": "process version",
    "timestamp": 0
    "schedule": {},
    "invoke": [
      {
        "id": 0,
        "type": "pipeline""
        "version": "plugin version",
        "timestamp": 0,
        "plugin": "sansa",
        "pipeline": "CopyIntoOrient",
        "extract": [
          "0"
        ]
        "persist": [
          "0"
        ]
      }
    ]
  }
}
```

FIG. 5

MODIFICATION OF A DATA MODEL INCLUDING A DATA SCHEMA AND AN ETL PIPELINE

BACKGROUND

Technical Field

The present disclosure generally relates to data processing, and more particularly, to a data model including an extract, transform, load (ETL) pipeline.

Description of the Related Art

Extract, transform, load refers to a data integration process that combines, cleans and organizes data from multiple sources into a single, consistent data set for storage in a data warehouse, data lake, or other target system. ETL pipelines are often used by organizations to extract data from legacy systems, cleanse the data to improve data quality and establish consistency, and load the data into target databases.

SUMMARY

According to various embodiments, a computer-implemented method, a computer system, and a computer program product are provided for modifying a data model including a data schema and an ETL pipeline. A plurality of user-defined configuration files are received from a user interface. Each file corresponds to a task in the ETL pipeline and provides a self-contained specification for modifying its corresponding task. The plurality of configuration files are used to make granular modifications to logic of the ETL pipeline at a task level to implement changes to the data model.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 provides examples of different user-defined configuration files, consistent with an illustrative embodiment.

DETAILED DESCRIPTION

Figure 1:
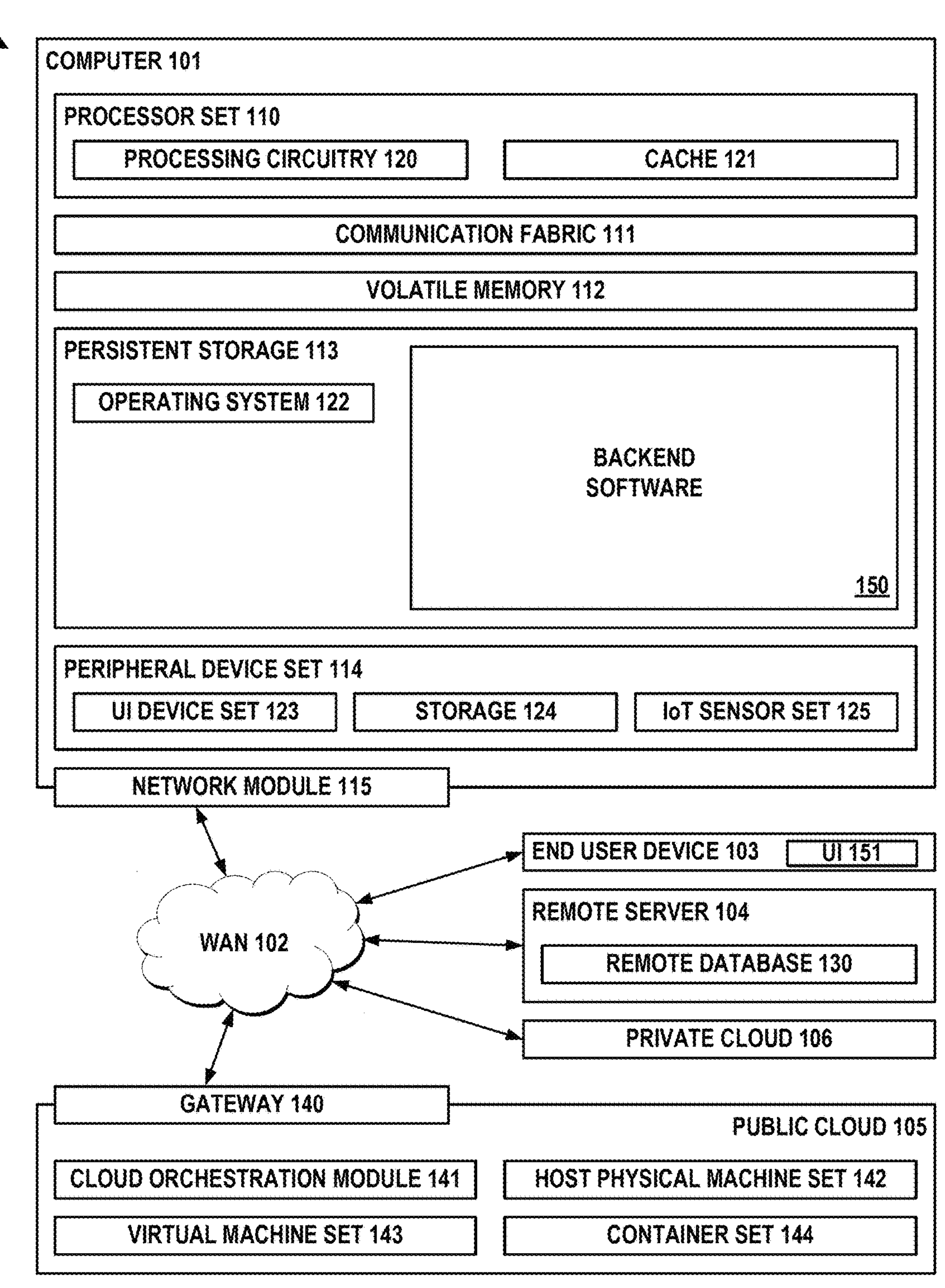
FIG. 1 is a particularly configured computing environment including a user interface and backend software, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Reference is made to FIG. 1. A computing environment 100 includes an example of an environment for the execution of at least some of the computer code involved in performing the inventive methods, such as computer code in backend software 150 and a user interface software 151. The computing environment 100 includes, for example, computer 101. The computing environment 100 may also include other features, such as a wide area network (WAN) 102, end user device 103, remote server 104, public cloud 105, and private cloud 106. In this embodiment, the computer 101 includes processor set 110, communication fabric 111, volatile memory 112, persistent storage 113 (including operating system 122 and backend software 150), peripheral device set 114 (including user interface (UI) device set 123, storage 124, Internet of Things (IOT) sensor set 125), and network module 115. Persistent memory of the end user device 103 includes the user interface software 151.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

At least some of the instructions for performing the inventive methods may be stored in persistent storage 113 as part of backend software 150. The instructions, when executed, cause the processor set 110 to perform the inventive methods, including modifying a data model including a data schema and an ETL pipeline. The backend software 150 may be standalone or it may be integrated with a larger operation.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through a network. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EU D 103 may be a client device, such as thin client, heavy client, mainframe computer, desktop computer and so on.

REMOTE SERVER 104 is any computer system that serves at least some data and/or functionality to computer 101. In some embodiments, remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (V CEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example Data Model

As used herein, a data schema defines structure and organization of data within a database. The schema outlines how data is organized, inclusive of logical constraints, such as table names, fields, data types and the relationships between these entities. The schema serves as a blueprint for how data is stored, accessed, and manipulated.

As used herein, a pipeline refers to a chain of tasks arranged so that the output of each task is the input of the next. In an ETL pipeline, the tasks include an extract task, a transform task, and a load task.

As used herein, a data model includes a data schema and an ETL pipeline.

Figure 2:
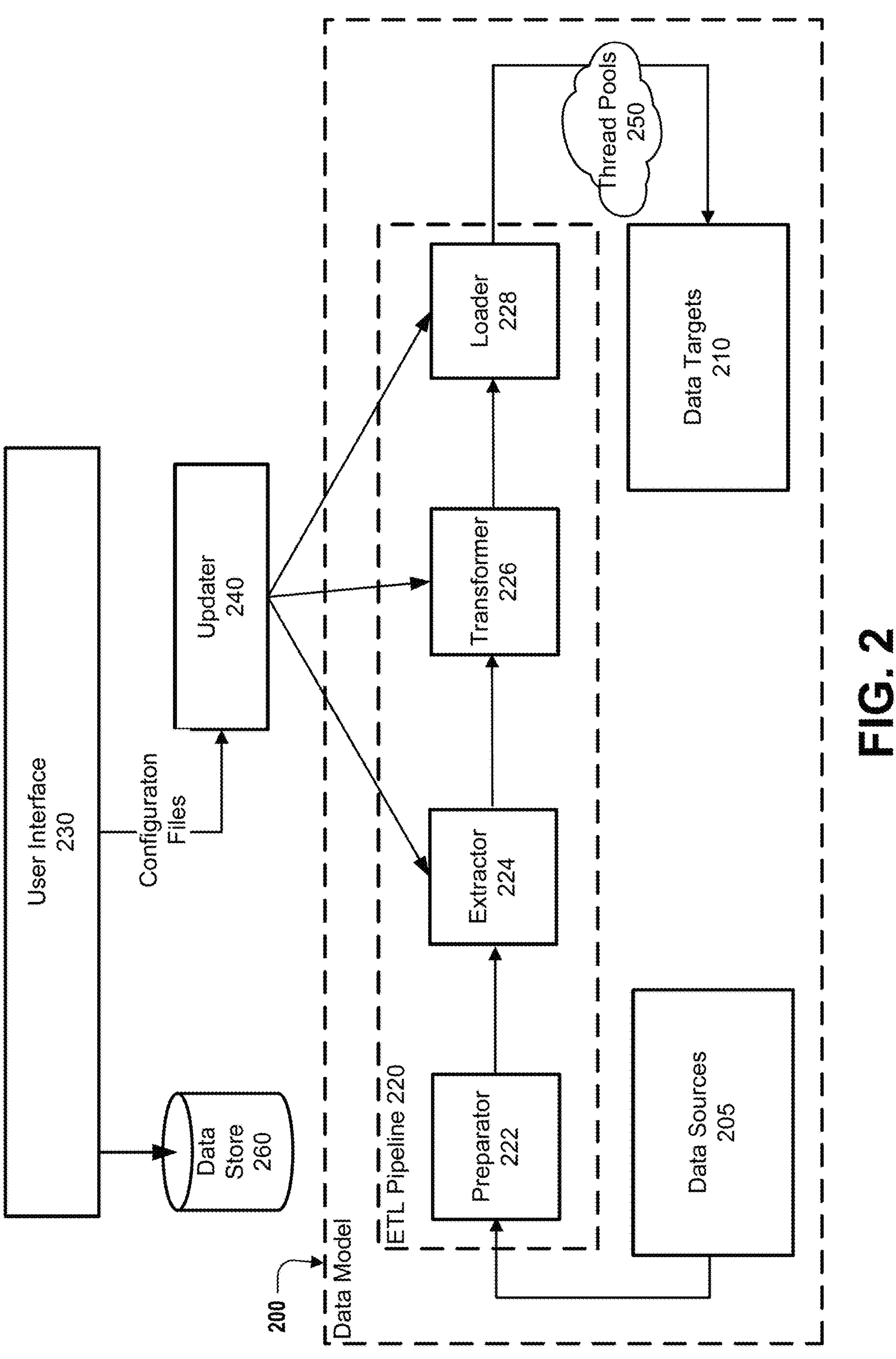
FIG. 2 is a data model, consistent with an illustrative embodiment.

Reference is now made to FIG. 2, which shows an example data model 200. The data model 200 includes a data schema with data sources 205 and data targets 210. The data sources 205 may include a variety of structured and/or unstructured sources. Examples of the data sources 205 include, but are not limited, to Structured Query Language (SQL) servers, Customer Relationship Management (CRM) and Enterprise Resource Planning (ERP) systems, JSON and XML files, flat-file databases, email, and web pages.

The data targets 210 may include files and databases. In some embodiments, at least some of the files and databases may be part of a data repository system, such as a data warehouse, a data vault, or a data lake.

The data model 200 further includes an ETL pipeline 220. The ETL pipeline 220 includes a preparator 222, an extractor 224, a transformer 226, and a loader 228. The preparator 222 includes logic for ensuring that all configurations are correct, consistent, and ready for execution before the ETL pipeline 220 begins processing. The extractor 224 includes logic for copying or exporting raw data from one or more of the data sources 205 to a target area.

The transformer 226 includes logic for processing raw data in the target area. The raw data in the target area is transformed and consolidated for its intended analytical use case. The processing may include, but is not limited to, filtering, cleansing, aggregating, de-duplicating, validating and authenticating the raw data; performing calculations, translations or summarizations based on the raw data (e.g., changing row and column headers for consistency, converting currencies or other units of measurement, and editing text strings); conducting audits to ensure data quality and compliance, and computing metrics; removing, encrypting or protecting data governed by industry or governmental regulators; and formatting the data into tables or joined tables to match the schema of data in the data target.

The loader 228 includes logic for moving data from the target area into the data targets 210. Typically, an initial loading of all data is performed, followed by periodic loading of incremental data changes and, less often, full refreshes to erase and replace data in the data targets 210.

Changes can be made to the data model 200. Examples of changes include, but are not limited to, (i) adding a new field to a database table to capture additional attributes (e.g., adding a "customer_tier" column to a customer table); (ii) changing the data type of an existing field, such as modifying a "transaction_date" field from string to timestamp to support time-based queries; (iii) adding a new lookup table and establishing a foreign key relationship; (iv) altering transformation logic in the ETL pipeline to include data masking or encryption of sensitive fields without modifying the underlying schema; and (v) changing the load strategy from full refresh to incremental updates based on change data capture mechanisms.

Figure 3:
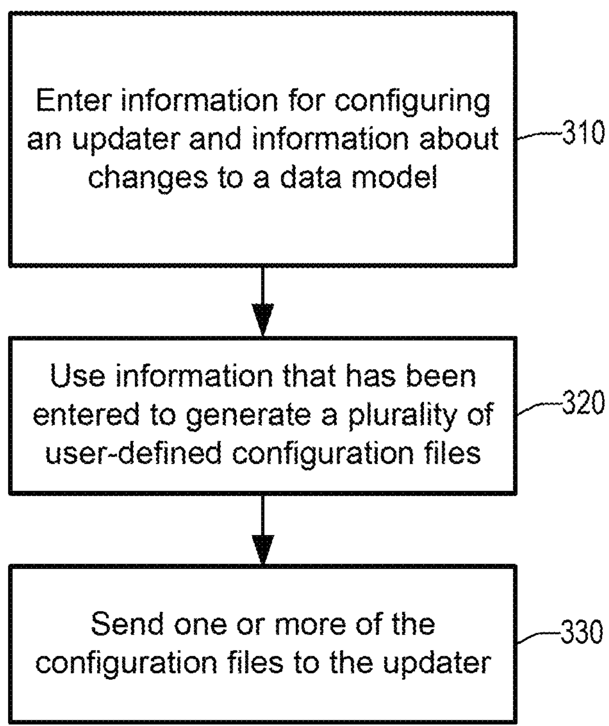
FIG. 3 is a user interface method, consistent with an illustrative embodiment.

FIG. 2 also shows a user interface 230 and an updater 240. The user interface 230, which may be part of the user interface software 151, communicates data model changes to the updater 240. In some embodiments, the user interface 230 prompts a user to enter information about changes to the data model 200. The user interface 230 then generates one or more configuration files that specify how the pipeline tasks will be modified to implement the changes in the data model 200. The configuration files, for example, may be in a JavaScript Object Notation (JSON) format. JSON is an open standard file format and data interchange format that uses text for storing and transmitting data objects such as name-value pairs and array. An example method performed by the user interface 230 is shown in FIG. 3.

Figure 4:
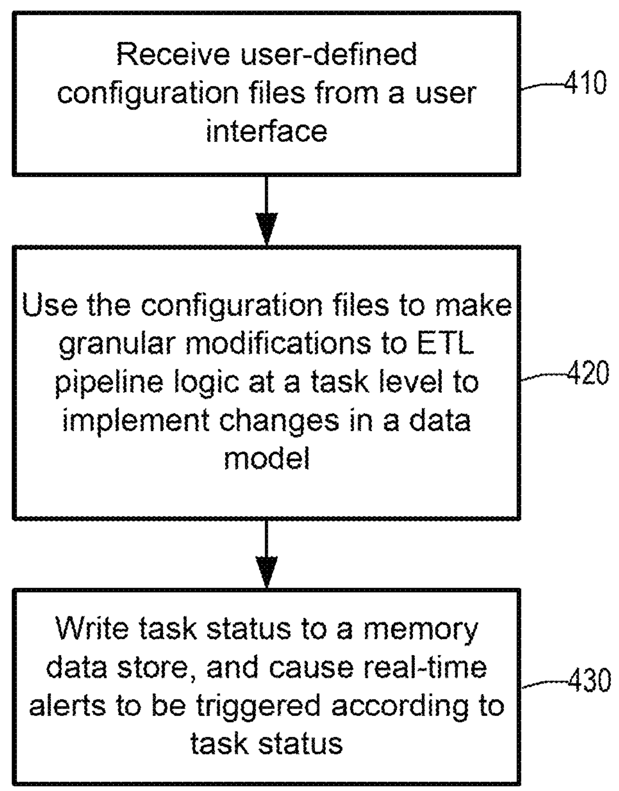
FIG. 4 is an updater method, consistent with an illustrative embodiment.

The updater 240, which may be part of the backend software 150, may include an interpreter or runtime orchestrator that receives the configuration files and updates the pipeline logic to implement the changes to the data model 200. An example method performed by the updater 240 is shown in FIG. 4.

In some embodiments, the ETL pipeline 220 and the updater 240 are implemented in a backend of a client-server system, and the user interface 230 is implemented in a frontend of the client-server system. The updater 240 may be implemented by computer 101. Data sources 205 and data targets 210 may be located on any of computer 101, remote server 104, public cloud 105 and private cloud 106. The ETL pipeline 220 may be located on computer 101 as part of the backend software 150, or it may be located in a data warehouse or other data target 210.

The user interface 230 may be resident on End User Device 103. The user interface 230 may, for instance, provide a visual drag-and-drop interface for selecting tasks to be configured, and entering information about the changes to the data model 200. In some embodiments, the user interface 230 may include a web browser and plug-in. However, the user interface is not so limited. More generally, the user interface 230 may be an UI-capable client that supports structured input and communication with the backend.

In some embodiments, the data model 200 may provide access interfaces through linked thread pools 250. The linked thread pools 250 support asynchronous changes, and also add performance, fault tolerance, and scalability benefits.

In some embodiments, real-time monitoring may be performed as the ETL pipeline 220 is being updated. Status updates (e.g., "Running", "Success", "Failed") may be written to a Remote Dictionary Server (Redis) 260 or other memory data store. The user interface 230 can poll the memory data store to immediately display the current update status. Use of the memory data store also enables alerts. Logs, dashboards, or notifications can trigger based on task state. A memory data store such as Redis has low-latency, making it ideal for real-time monitoring.

Example User Interface Method

Reference is now made to FIG. 3, which shows an example method performed by the user interface 230. The example method is described in connection with a frontend of a client-server system. The example also describes configuration files in the JSON format.

At block 310, the user interface 230 enables a user to enter information for configuring the updater 240 and information about changes to the data model 200. The user provides information such as ETL pipeline tasks, data source information, custom SQL or script references, task configurations (e.g., schedule or trigger points).

At block 320, the user interface 230 uses information that has been entered to generate a plurality of user-defined configuration files. Each configuration file corresponds to a task in the ETL pipeline and provides a self-contained specification for modifying its corresponding task.

In some embodiments, the user-defined configuration files may be JSON files, such as an Extract.json file, a Mapping.json file, and a Persist.json file. The Extract.json file lists data sources and corresponding access information for extracting data. If a data source is a file type, a user may configure the extract task to specify a uniform resource locator (URL) and username password. If a data source is a database, the Extract.json file specifies the corresponding access information and target table, etc.

The Mapping.json file includes information for transforming data. The Mapping.json file may specify field matching rules for heterogeneous data conversion processing. The Persist task includes information for accessing and configuring the data target 210.

FIG. 5 provides some examples of JSON files 510, 520, 530 and 540. File 510 is an example of an Extract.json file 510, which provides information, including a URL, user name and password, for accessing a file stored on a data source 205.

File 520 is an example of a Mapping.json file 520, which provides information for mapping from a data source 205 to a data target 210.

File 530 is an example of a Persist.json file 530, which provides information for storing a graph.

In some embodiments, a user query allows a user to customize data. In a query, a user may specify an SQL file, data source information, data storage information, pipeline list to be called, and so on in procession.

In some embodiments, the ETL pipeline includes a process task, which allows a user to generate or update scripts or configurations for customized data modeling operations within the ETL pipeline. File 540 is an example of a Process.json file, which provides instructions for data processing.

At block 330, one or more of the JSON files are transmitted to the updater 240. At the backend, the JSON files are received by the updater 240.

Example Updater Method

Reference is now made to FIG. 4, which illustrates an example method performed by the updater 240. The example method is described in connection with a backend of a client server system.

At block 410, user-defined configuration files are received from the user interface 230. Each configuration file corresponds to a task in the ETL pipeline 220 and provides a self-contained specification for modifying its corresponding ETL task, meaning that each configuration file encapsulates all information necessary to modify its corresponding task without requiring access to or coordination with other configuration files.

At block 420, the configuration files are used to make granular modifications to logic of the ETL pipeline at the task level to implement changes to the data model. The updater 240 may include an interpreter or runtime orchestration engine that parses and runs scripts based on the JSON configuration files. In some embodiments, the updater 240 parses the configuration files and maps their contents to corresponding components of the ETL pipeline 220. Logic changes may be implemented by injecting new code segments, altering function parameters, enabling or disabling transformation rules, or reordering task execution steps. In some embodiments, the updater 240 uses templated scripts or a plugin-based architecture to replace or override portions of existing task definitions at runtime or during pipeline deployment.

For example, extract logic in the ETL pipeline is modified through an Extract.json file, transform logic in the ETL pipeline is modified through a Mapping.json file, and load logic in the ETL pipeline is customized through the Persist.json file. The Extract.json file defines all parameters and operations needed for data extraction, such as source endpoints, authentication credentials, field selection, and filtering criteria. When the Extract.json file is processed, the update 240 either replaces the extract logic entirely or applies incremental updates, such as altering the source query or switching between batch and streaming modes.

The Mapping.json file provides a declarative specification of transformation logic, such as renaming fields, applying computed columns, reformatting values, and chaining together multiple transformation steps. When the Mapping.json file is processed, the updater 240 can inject the transformation logic into an existing transformation graph or replace sections of the graph, depending on the scope of changes defined in the Mapping.json file.

The Persist.json file contains rules for how and where the transformed data should be written, such as output schema definitions, target database connections, partitioning strategies, and write modes (e.g., append vs. overwrite). The Persist.json file may override prior settings or extend the existing load behavior by adding post-processing operations such as deduplication and upsert (update and insert).

The updater 240 treats each JSON file as a black box, ensuring modularity. The updater 240 does not need to know the internal logic of other tasks or how they are implemented. Each configuration file is independent of other configuration files. Self-contained specifications and modularity enable granular modifications to the ETL logic at the task level, improving reusability, and clarity. It also allows users to customize individual stages of the pipeline with minimal coupling and high flexibility.

At block 430, task status is written to a memory data store; and real-time alerts are triggered according to task status. This feature allows interactive, event-driven control over data changes, which is beneficial for usability, efficiency, and system responsiveness.

Methods herein enable a user to make changes to an ETL pipeline without having any knowledge of the ETL pipeline's internal logic. The methods herein quickly and efficiently respond to dynamic changes in a data model. Sometimes even just modifying a single field attribute can bring a lot of code rewriting. If a data model is modified frequently, the amount of code rewriting is scaled upwards. Methods herein avoid the code rewriting, and enable frequent modifications to be made quickly and efficiently.

Data visualization can help users intuitively understand the process and results of data integration. That is, it helps users intuitively understand how data is extracted from multiple sources, transformed, and unified.

CONCLUSION

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail herein, the operational/functional language is to be read in its proper technological context, i.e., as concrete specifications for physical implementations.

It should be appreciated that the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably processed manually by a human user.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for modifying a data model including a data schema and an extract, transform, load (ETL) pipeline, the computer-implemented method comprising:

receiving a plurality of user-defined configuration files from a user interface, wherein each file corresponds to a task in the ETL pipeline and provides a self-contained specification for modifying its corresponding task;

using the plurality of user-defined configuration files to make granular modifications to logic of the ETL pipeline at a task level to implement asynchronous changes, via linked thread pools, to the data model, wherein the linked thread pools are implemented as a plurality of thread pools that are linked to respective tasks of the ETL pipeline so that granular modifications for different tasks are executed asynchronously on different thread pools; and writing, in real time as the granular modifications are applied, a respective task status for each of the tasks to a memory data store; and triggering, from the memory data store, real-time alerts according to the task statuses that initiate updates to the user interface to display a current task status of each of the tasks, wherein the user interface polls the memory data store upon initiation by the real-time alerts.

2. The computer-implemented method of claim 1, wherein making the granular modifications includes using an interpreter or runtime orchestration engine to parse and run scripts based on the plurality of user-defined configuration files via the linked thread pools.

3. The computer-implemented method of claim 1, wherein:

the ETL pipeline includes an extract task, a transform task, and a load task; and the plurality of user-defined configuration files includes:

a first file that provides a self-contained specification for modifying the extract task;

a second file that provides a self-contained specification for modifying the transform task; and a third file that provides a self-contained specification for modifying the transform task.

4. The computer-implemented method of claim 3, wherein the plurality of user-defined configuration files further includes a fourth file that provides a self-contained specification for customizing data modeling operations within the ETL pipeline.

5. The computer-implemented method of claim 1, further comprising using an end user device to:

enter changes to the data model;

generate the plurality of user-defined configuration files; and send the plurality of user-defined configuration files.

6. The computer-implemented method of claim 1, wherein:

the computer-implemented method is implemented by a backend of a client-server system; and the plurality of user-defined configuration files are generated by and received from a frontend of the client-server system and are applied to the ETL pipeline through the linked thread pools.

7. The computer-implemented method of claim 1, wherein the granular modifications to the logic of the ETL pipeline are implemented by injecting new code segments, altering function parameters, and reordering task execution steps.

8. The computer-implemented method of claim 1, wherein the memory data store comprises a Remote Dictionary Server (Redis), and further comprising writing task status for each of the tasks to the memory data store includes updating corresponding Redis key-value pairs for the tasks as the tasks are being modified.

9. A computer system comprising:
a memory having computer readable instructions; and
one or more processors for executing the computer readable instructions to configure the computer system to perform a method for modifying a data model including a data schema and an extract, transform, load (ETL) pipeline, the method comprising:
receiving a plurality of user-defined configuration files from a user interface, wherein each file corresponds to a task in the ETL pipeline and provides a self-contained specification for modifying its corresponding task;
using the plurality of user-defined configuration files to make granular modifications to logic of the ETL pipeline at a task level to implement asynchronous changes, via linked thread pools, to the data model, wherein the linked thread pools are implemented as a plurality of thread pools that are linked to respective tasks of the ETL pipeline so that granular modifications for different tasks are executed asynchronously on different thread pools; and
writing, in real time as the granular modifications are applied, a respective task status for each of the tasks to a memory data store; and
triggering, from the memory data store, real-time alerts according to the task statuses that initiate updates to the user interface to display a current task status of each of the tasks, wherein the user interface polls the memory data store upon initiation by the real-time alerts.

10. The computer system of claim 9, wherein:
the ETL pipeline includes an extract task, a transform task, and a load task; and
the plurality of user-defined configuration files includes:
a first file that provides a self-contained specification for modifying the extract task;
a second file that provides a self-contained specification for modifying the transform task; and
a third file that provides a self-contained specification for modifying the transform task.

11. The computer system of claim 10, wherein the plurality of user-defined configuration files further includes a fourth file that provides a self-contained specification for customizing data modeling operations within the ETL pipeline.

12. The computer system of claim 9, wherein:
the computer readable instructions include an updater that is configured to receive the plurality of user-defined configuration files and make the granular modifications via the linked thread pools that support asynchronous changes; and
the updater is part of a backend of a client-server system.

13. The computer system of claim 12, further comprising a front end of the client-server system, wherein the front end is configured to generate the user-defined configuration files and send the user-defined configuration files to the updater.

14. The computer system of claim 9, wherein the granular modifications to the logic of the ETL pipeline are implemented by injecting new code segments, altering function parameters, and reordering task execution steps.

15. The computer system of claim 9, wherein the memory data store comprises an in-memory Remote Dictionary Server (Redis) that stores task status entries for the tasks, and further comprising causing the user interface to continuously poll the Redis memory data store, and update, in real time, a visual indicator of the Running, Success, or Failed status for each task, and to raise alerts when a task enters a Failed status.

16. A computer program product comprising one or more computer-readable memory devices encoded with data including instructions that, when executed, causes a processor set to carry out a method for modifying a data model including a data schema and an extract, transform, load (ETL) pipeline, the method comprising:
receiving a plurality of user-defined configuration files from a user interface, wherein each file corresponds to a task in the ETL pipeline and provides a self-contained specification for modifying its corresponding task;
using the plurality of user-defined configuration files to make granular modifications to logic of the ETL pipeline at a task level to implement asynchronous changes, via linked thread pools, to the data model, wherein the linked thread pools are implemented as a plurality of thread pools that are linked to respective tasks of the ETL pipeline so that granular modifications for different tasks are executed asynchronously on different thread pools; and
writing, in real time as the granular modifications are applied, a respective task status for each of the tasks to a memory data store; and
triggering, from the memory data store, real-time alerts according to the task statuses that initiate updates to the user interface to display a current task status of each of the tasks, wherein the user interface polls the memory data store upon initiation by the real-time alerts.

17. The computer program product of claim 16, wherein:
the ETL pipeline includes an extract task, a transform task, and a load task; and
the plurality of user-defined configuration files that are used to make the granular modifications includes:
a first file that provides a self-contained specification for modifying the extract task;
a second file that provides a self-contained specification for modifying the transform task; and
a third file that provides a self-contained specification for modifying the transform task.

18. The computer program product of claim 17, wherein the plurality of user-defined configuration files further includes a fourth file that provides a self-contained specification for customizing data modeling operations within the ETL pipeline.

19. The computer program product of claim 16, wherein the granular modifications to the logic of the ETL pipeline are implemented by injecting new code segments, altering function parameters, and reordering task execution steps.

20. The computer program product of claim 16, wherein the instructions further cause the processor set to:
instantiate the linked thread pools as access interfaces to the ETL pipeline, each linked thread pool being associated with one or more tasks in the ETL pipeline and processing the granular modifications to the one or more tasks asynchronously;
write, during the granular modifications, the task status for each of the tasks into the memory data store implemented as a Remote Dictionary Server (Redis), including status values Running, Success, and Failed; and trigger, based on the task status in the Redis memory data store, real-time alerts comprising at least one of logs, dashboards, and notifications that are generated when a task changes from Running to Failed so that a user interactively controls data model changes as the ETL pipeline is being updated.

* * * * *